Patented Aug. 24, 1954

2,687,394

UNITED STATES PATENT OFFICE 2,687,394

COATED PARTICLES OF CALCIUM CARBONATE AND METHOD OF MAKING SAME

Harry J. Somermeyer, Painesville, Ohio, assignor to Diamond Alkali Company, Cleveland, Ohio, a corporation of Delaware No Drawing. Application August 20, 1949, Serial No. 111,571

8 Claims. (Cl. 260—41)

This invention relates to coagulation of polymer emulsions and more particularly relates to methods of obtaining an intimate combination of polymer and desired filler at the emulsion coagulation stage, and to new compositions of matter comprising such combinations. It has its optimum application in the obtaining of filled polyvinyl chloride from emulsions of polyvinyl chloride.

Various means of polymerizing organic compounds having ethylenic unsaturation are known to the art, one of the most common and widely used being polymerization in emulsions in the presence of suitable catalysts, such as catalysts known as "redox" systems including, for example, a reducing and an oxidizing agent having the characteristic of producing free radicals. A problem which the art has faced is that upon obtaining the polymer in emulsion form in a liquid system, it has been necessary to coagulate the polymer in order to recover the same in a useful form. Various prior art methods of coagulating the polymer, such as freezing, treating with a lower aliphatic alcohol, or treating with an electrolyte, are well-known but all such methods have disadvantages peculiar to their particular operation and none of the methods provides anything but a coagulation of the polymeric material originally in the emulsion uncombined with any other substances of a desired character.

Similarly, it is well-known in the prior art to combine various filler materials for purpose of reinforcement or extension with polymers of organic materials having ethylenic unsaturation. Common methods of obtaining such combinations have included the mechanical mixing of the filler material with the recovered polymeric material on rubber mills, Banbury mixers, or the like. These methods have produced combinations of more or less use in the arts but especially in the case where the combination of a very fine particle material with the polymeric material is desired, problems have been encountered, and are as yet unsolved, of obtaining intimate mixture and especially of avoiding agglomeration of the filler materials to be added. These problems are especially noticeable in the combination of the relatively cheap fillers, such as calcium carbonate, with relatively common polymeric materials, such as polyvinyl chloride, and are particularly onerous where it is desired to combine especially fine particle size calcium carbonate with polyvinyl chloride, since the most efficient means of mixing now known, including rubber mills and the like, fail to produce a completely homogeneous mass. Thus, the resultant combination of the two materials, no matter how efficiently mixed, is characterized by specks of agglomerated and unwetted calcium carbonate in the matrix comprising the final mixture and particularly is characterized by low resistance to crease or scratch in that both on creasing or on scratching, white parts show up which destroy the appearance of the material and reduce its usefulness in various applications, such as artificial leather, floor tile, and the like.

It is an object of the present invention to provide a method for coagulating polymer emulsions characterized particularly by the advantage of producing a polymer in which a filler is incorporated in the course of the coagulation step.

It is a further object of the present invention to provide a combination of polymer and filler which shall be intimately mixed, avoiding the spotty nature of materials of the prior art and particularly being highly resistant to color change and weakening on creasing or scratching.

A further object of the invention is to provide a method of coagulating polyvinyl chloride by contacting an emulsion of the same with fine particle size calcium carbonate.

A further object of the invention is to provide an improved combination of polyvinyl chloride and calcium carbonate characterized by complete homogeneity and relative absence of color change on creasing and scratching.

In pursuance of these and other objects of the invention which will appear hereinafter, the invention contemplates a method which includes the steps of contacting an emulsion of polymerized polyvinyl chloride with a slurry of calcium carbonate to coagulate the emulsion, and recovering the combined calcium carbonate-polyvinyl chloride as a completely homogeneous mixture.

In accordance with the present invention, an emulsion of an organic polymeric material derived from an organic material having ethylenic unsaturation, such as an emulsion of polyvinyl chloride having a molecular weight by viscosity in the range of 50,000 to 150,000 and suitably approximately 100,000 in relatively dilute emulsion, is contacted with a slurry of precipitated calcium carbonate of a particle size averaging below one micron and preferably below 0.1 micron, suitably in the range of 0.05 to 0.06 micron, the amount of calcium carbonate contacting the polyvinyl chloride being of the order of between about one-half and twice the weight of polyvinyl chloride present in the emulsion. The coagulation may take place at room temperature or may, if desired, be conducted at a slightly elevated temperature, such as up to 100° C., and is complete in a relatively short time, as evidenced by filtration on a fritted glass filter or the like suitably provided with filter paper or other filter medium, the completion of the coagulation being evidence by the clarity of the filtrate. The recovered coagulated material after washing, which does not produce an appreciable quantity of calcium ions and certainly insufficient calcium ions to indicate the loss of the calcium carbonate by washing, is processed to obtain a yield of polyvinyl chloride in admixture with calcium carbonate which, after addition of plasticizers and other conventional additives, is apparent on inspection to be completely homogeneous, absolutely devoid of white specks indicating unassimilated calcium carbonate particles, and is highly resistant to change of color on scratching or creasing when the same is sheeted.

While, in general, the process of the invention may be conducted with a wide range of concentrations of polyvinyl chloride emulsion and calcium carbonate, it has been found preferable to operate in the range of concentration of approximately 10% to 30% of polyvinyl chloride in the emulsion liquid and to add this emulsion to a calcium carbonate suspension diluted to a range of concentration of the order of 2% to 10%. When operating in these ranges of concentration, a considerably improved action of precipitation and washing has been observed and hence, considerable labor and time is saved.

The amount of calcium carbonate which may be combined with polyvinyl chloride in accordance with the method of the present invention ranges from about 35 to about 65 weight per cent of the total of calcium carbonate and polyvinyl chloride. In this range of concentrations, the calcium carbonate is found to be much more intimately dispersed in the polyvinyl chloride than can be obtained on mixing rolls or the like. A particular advantage of the invention arises from the fact that calcium carbonate used in its practice need not have been dried in the course of manufacture, since it is in any event to be employed in the form of a slurry. Prior art methods of combining polyvinyl chloride and calcium carbonate necessitated using previously dried calcium carbonate at correspondingly increased expense and greater likelihood of already formed, relatively large size agglomerates being present.

As noted above, the invention is particularly applicable to especially fine particle size calcium carbonate within the range set forth; while relatively coarser calcium carbonate may be used as a filler and may suitably be combined with polyvinyl chloride on conventional mixing rolls with little or no difficulty from specking caused by agglomeration, such combinations have extremely low crease and scratch resistance and hence present serious problems in use. In addition, combinations of the coarser material with polyvinyl chloride have physical properties so far below the unfilled material that their commercial application is considerably limited. It is only when the finer particle size materials, such as those of the micron range set forth above, are combined with polyvinyl chloride that substantial filling can be obtained without serious deleterious effect upon physical properties, whereby a filled material of actual commercial applicability is had.

While no limitation of the invention by a postulated theory of its action is intended, in order to inform those skilled in the art most fully of the manner in which the invention is believed to operate, the following is set forth:

It has been found by experimental determination that there is a minimum amount of electrolyte, i. e., soluble electrolyte, necessary to coagulate a given amount of polyvinyl chloride in emulsion form. Thus, it has been determined experimentally, employing calcium chloride as the coagulant, that the necessary amount of calcium ion available in the solution for complete coagulation is of the general order of a 0.0132 molar solution, some variations occurring, depending upon the concentration of polyvinyl chloride, though as it will be recognized, this variation is not of a stoichiometric character. Inasmuch as the calcium ion exists in a calcium carbonate-water combination, however, only in a concentration of 0.00014 molar $Ca^{++}$, it is apparent that the phenonemon of coagulation is caused in the present invention by something else than the $Ca^{++}$ ion in aqueous solution as in conventional calcium chloride coagulation.

While the phenonemon of coagulation of emulsions is not completely understood, it is well-known that the phenonemon is one of an electrical character and requires the presence in an emulsion system of a definite concentration of charged particles in order to effect coagulation. Moreover, it is also known that ion interchange takes place between the crystalline calcium carbonate and the calcium ions in the solution at the surface of the calcium carbonate crystals and that therefore a substantial concentration of calcium ions exists at the surface of the calcium carbonate crystals. Accordingly, it is apparent that rather than an electrolyte, existing as an ion in the solution, effecting the coagulation of the polyvinyl chloride from the emulsion system as such, in this case the polyvinyl chloride is coagulated at the crystal surface and deposited upon the crystals of the calcium carbonate. Moreover, this is borne out by examination of the final product of this invention, from which it can be seen that there is a total absence of agglomerated calcium carbonate and that the calcium carbonate is so finely distributed with the polyvinyl chloride that visual examination thereof gives no evidence of presence of calcium carbonate as such.

The present invention, in addition to being applicable to the coagulation and co-precipitation with the filler calcium carbonate of polyvinyl chloride as such, is also applicable to copolymers with polyvinyl chloride, although among the polymers to which the invention is applicable, it has been found that vinyl chloride is coagulated most satisfactorily by the process of this invention and is preferred. The process, however, is applicable to the coagulation of emulsions of vinyl chloride which has been polymerized in the presence of other materials which contain an ethylenic bond capable of vinyl polymerization. The method of this invention therefore provides an effective means of obtaining high quality copolymers filled with calcium carbonate in a more intimate manner than heretofore has been possible by prior art methods. Thus, high quality filled copolymers may be obtained with the following substances: Methyl methacrylate, ethyl methacrylate, butyl methacrylate, octyl methacrylate, 2-nitro-2-methyl propyl methacrylate, methoxyethyl methacrylate, chlorethyl methacrylate, phenyl methacrylate, cyclohexyl methacrylate, and the corresponding esters of acrylic acid, acrylo- and methacrylonitrile, acryl- and methacrylamide or mono-alkyl substitution products thereof; unsaturated ketones such as methyl vinyl ketone, phenyl vinyl ketone and methyl isopropenyl ketone; asymmetrical dihalogen ethylenes such as asymmetrical dichloroethylene; vinyl carboxylates such as vinyl acetate, vinyl chloro acetate, vinyl propionate, vinyl butyrate and vinyl stearate; vinylene-alpha-beta dicarboxylic acids, or their anhydrides or derivatives such as maleic anhydride, fumaric esters, maleic esters, citraconic esters and mesaconic esters; vinyl carbozole; vinyl ethers; mono-olefines and substitution products thereof as styrene, isobutylene, and the like. With regard to copolymers, this invention is chiefly concerned with copolymers of vinyl chloride and one or more other operable monomers which contain from about 50% to 95% or more of vinyl chloride by weight. While it is apparent that the properties of the copolymers filled in accordance with the method of the invention will depend to some extent upon the type and amount of the copolymerized ingredient included with the vinyl chloride, in general, since vinyl chloride will predominate, the properties of vinyl chloride also will predominate in the combination. As noted above, it is within the scope of this invention to coagulate an emulsion of polymerized vinyl chloride which has been conjointly polymerized with two or more compounds which contain an ethylenic bond capable of vinyl polymerization.

In order that those skilled in the art may more fully understand the present invention and the method by which its practice is most suitably effected, the following examples are offered:

EXAMPLE I

A polyvinyl chloride emulsion produced by polymerizing monomeric vinyl chloride in emulsion in the presence of a "redox" system comprising sodium persulfate, sodium sulfite, is obtained in a concentration of 22.1 gms. of polyvinyl chloride to 100 mls. of emulsion. To this emulsion, 100 gms. of distilled water are added and upon complete mixture being obtained, the diluted emulsion is added with stirring to 100 mls. of a dispersion in water of calcium carbonate containing 4.10 gms. of calcium carbonate, the particles of which have a size of the order of 0.05 to 0.06 micron. Coagulation occurs as the emulsion is added and is completed without further addition of electrolyte. The combination is heated to 75–80° C. and precipitated, filtered and washed with considerable ease. Upon drying, the filled product comprising the intimate combination of polymerized vinyl chloride and calcium carbonate, after mixing and working up on a rubber mill, shows on visual inspection no evidence whatsoever of specks of calcium carbonate and moreover shows high resistance to color change on scratching and creasing.

A similar combination of calcium carbonate and polyvinyl chloride prepared by mixing the dry calcium carbonate and the polymer on rubber mill rolls and subsequent hammer milling shows substantial specking with calcium carbonate and very substantial color change on scratching and creasing.

EXAMPLE II

Following the procedure of Example I, the following combinations of polyvinyl chloride of a molecular weight of about 100,000 and calcium carbonate having a particle size of the order of less than 0.08 micron were prepared:

|  | Parts | | |
|---|---|---|---|
|  | A | B | C |
| Polyvinyl Chloride | 2 | 1 | ½ |
| Calcium Carbonate | 1 | 1 | 1 |

These samples, upon completion of coagulation, were dried and hammer milled twice to reduce the size of the dried particles and then incorporated in the following formulae:

No. 1

| | Parts |
|---|---|
| A (above) | 60 |
| Polyvinyl chloride | 10 |
| Dioctyl phthalate | 33 |
| Basic lead carbonate | 3 |
| Stearic acid | 0.5 |
| Chrome green | 3 |

No. 2

| | Parts |
|---|---|
| B (above) | 40 |
| Polyvinyl chloride | 30 |
| Dioctyl phthalate | 33 |
| Basic lead carbonate | 3 |
| Stearic acid | 0.5 |
| Chrome green | 3 |

No. 3

| | Parts |
|---|---|
| C (above) | 30 |
| Polyvinyl chloride | 40 |
| Dioctyl phthalate | 33 |
| Basic lead carbonate | 3 |
| Stearic acid | 0.5 |
| Chrome green | 3 |

No. 4

| | Parts |
|---|---|
| Calcium carbonate | 20 |
| Polyvinyl chloride | 50 |
| Dioctyl phthalate | 33 |
| Basic lead carbonate | 3 |
| Stearic acid | 0.5 |
| Chrome green | 3 |

The materials are combined by first mixing the polyvinyl chloride-calcium carbonate coagulated mix, added vinyl chloride, basic lead carbonate, stearic acid, and chrome green, and upon complete mixing being achieved, the dioctyl phthalate is added. The additional polyvinyl chloride prepared by conventional methods is added in Nos. 1–3 to provide for absolute comparison with No. 4, whereby Nos. 1–4 have the same amount of polyvinyl chloride and calcium carbonate. The mixing is achieved on the rolls of a rubber mill with the rolls being set at 300° F. The dispersion of calcium carbonate is immediately apparent to be much more complete than that obtained by mechanical mixing of the polyvinyl chloride and the filler in No. 4, especially since the control mix contains many hundreds of large white specks of undispersed calcium carbonate. These prepared mixes are tested for tensile strength per square inch, elongation at break, and tear strength and the materials of this invention, Nos. 1–3, are found to be equal to or better than the control material in No. 4.

EXAMPLE III

An emulsion comprising 95 parts of polyvinyl chloride and 5 parts of methyl methacrylate copolymerized together in 130 mls. of water to a concentration so that the copolymer comprises 25 gms. in the solution, is diluted to twice its volume and poured into 500 mls. of water containing 25 gms. of finely divided calcium carbonate dispersed therein. The coagulation occurs almost immediately and upon heating to 75-80° C., filtering and washing are effected with great ease. Upon processing the copolymer in accordance with the procedure of Example II, the physical properties are found to be at least equal to and in some cases slightly superior to those of a control batch of the same copolymer coagulated by conventional methods to which the same amount of calcium carbonate is added on the rubber mill rolls subseqquent to coagulation.

EXAMPLE IV 25 gms. of a copolymer of 95% polyvinyl chloride and 5% of polymerized vinyl acetate in 226 mls. of water are slowly poured with stirring into a mixture of 500 mls. of water and 25 gms. of dispersed calcium carbonate. Coagulation occurs almost immediately and upon heating to 95° C., filtration and washing are easily effected in the manner of Example I. Upon recovery of the copolymer combined with the calcium carbonate filler, and upon treatment in accordance with the practice of Example II, a copolymer loaded with calcium carbonate is recovered which shows no evidence of calcium carbonate agglomerates upon visual inspection and has physical properties in most cases equal to and in some cases superior to a control material of the similar copolymer processed in the conventional manner.

While there have been described various embodiments of the invention, the methods and products described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. The method of coagulating a polymer emulsion obtained by emulsion polymerization of a monomer comprising vinyl chloride, which includes the steps of mixing said emulsion with an aqueous slurry of calcium carbonate having an average particle size of less than one micron, thereby to coagulate said emulsion and deposit polymer particles of said emulsion upon said particles of calcium carbonate, and recovering the coagulated material thus formed.

2. The composition obtained by the method of claim 1.

3. The method of claim 1 in which the amount of said calcium carbonate in said slurry is of the order of from one-half to twice the weight of polymer in said polymer emulsion.

4. The method of coagulating a copolymer emulsion obtained by conjointly polymerizing an emulsion of a comonomer containing 50-95% of vinyl chloride, which includes the steps of mixing said emulsion with an aqueous slurry of calcium carbonate having an average particle size of less than one micron, the amount of said calcium carbonate in said slurry being of the order of from one-half to twice the weight of polymer in said copolymer emulsion, thereby to coagulate said emulsion and deposit copolymer particles of said emulsion upon said particles of calcium carbonate, and recovering the coagulated material thus formed.

5. The composition obtained by the method of claim 4.

6. The method of coagulating a polymer emulsion obtained by emulsion polymerization of vinyl chloride, which includes the steps of mixing said emulsion with an aqueous slurry of calcium carbonate having an average particle size of less than one micron, the amount of vinyl chloride polymer in said polymer emulsion being within the range of 10-30% of the total emulsion, and the amount of calcium carbonate in said slurry being between 2% and 10% of the total weight of said slurry, the amount of said slurry being sufficient to provide calcium carbonate of from one-half to twice the weight of vinyl chloride polymer in said emulsion, thereby to coagulate said emulsion and deposit polyvinyl chloride particles of said emulsion upon said particles of calcium carbonate, and recovering the coagulated material thus formed.

7. The method of claim 6 in which the particle size of said calcium carbonate is within the range of 0.05-0.10 micron.

8. The composition obtained by the method of claim 7, in which the polyvinyl chloride has a molecular weight within the range of 50,000-100,000.

References Cited in the file of this patent

UNITED STATES PATENTS

| Number | Name | Date |
|---|---|---|
| 2,403,215 | Foster | July 2, 1946 |
| 2,427,507 | Powell et al. | Sept. 16, 1947 |
| 2,483,959 | Baer | Oct. 4, 1949 |
| 2,483,960 | Baer | Oct. 4, 1949 |
| 2,490,247 | Amberg | Dec. 6, 1949 |
| 2,557,474 | Sanderson | June 19, 1951 |